United States Patent [19]

Bourneuf et al.

[11] Patent Number: 5,555,721
[45] Date of Patent: Sep. 17, 1996

[54] GAS TURBINE ENGINE COOLING SUPPLY CIRCUIT

[75] Inventors: John J. Bourneuf, Jamaica Plain, Mass.; Dean T. Lenahan, Cinncinnati, Ohio; Daniel E. Demers, Ipswich, Mass.; Larry W. Plemmons, Fairfield, Ohio

[73] Assignee: General Electric Company, Cincinnati, Ohio

[21] Appl. No.: 313,951

[22] Filed: Sep. 28, 1994

[51] Int. Cl.⁶ ......................................... F02C 7/12
[52] U.S. Cl. .......................... 60/39.75; 415/115
[58] Field of Search .................. 60/39.07, 39.75; 415/108, 115, 178

[56] References Cited

U.S. PATENT DOCUMENTS

| | | | |
|---|---|---|---|
| 4,127,988 | 12/1978 | Becker . | |
| 4,296,599 | 10/1981 | Adamson | 415/115 |
| 4,425,079 | 1/1984 | Speak et al. | 415/115 |
| 4,459,802 | 7/1984 | Mowill | 60/39.07 |
| 4,462,204 | 7/1984 | Hull . | |
| 4,574,584 | 3/1986 | Hovan | 60/39.07 |
| 4,657,482 | 4/1987 | Neal | 60/39.07 |
| 4,807,433 | 2/1989 | Maclin et al. | 415/115 |
| 4,923,370 | 5/1990 | Larson et al. | 415/115 |
| 5,144,794 | 9/1992 | Kirikami et al. | 415/115 |
| 5,174,105 | 12/1992 | Hines | 60/39.07 |
| 5,187,931 | 2/1993 | Taylor | 60/39.07 |
| 5,189,874 | 3/1993 | Kreitmeier . | |
| 5,271,711 | 12/1993 | McGreehan et al. | 415/115 |
| 5,327,719 | 7/1994 | Mazeaud et al. | 415/115 |

OTHER PUBLICATIONS

"Combined Power", *Flight International* 9–15, Jun. 1993, pp. 64 and 67–70.

*Primary Examiner*—Louis J. Casaregola
*Attorney, Agent, or Firm*—Andrew C. Hess; Wayne O. Traynham

[57] ABSTRACT

A turbine cooling supply circuit for a gas turbine engine is disclosed in which the flow of coolant through the engine is directed to minimize temperature rise prior to discharge into the turbine. Bleed air from an impeller stage of a compressor is channeled along a backwall thereof into a cavity disposed radially inwardly of a combustor casing. The cavity is divided by a lightweight tubular member having a circumferentially uniform contour into a non-flow zone proximate the casing and a flow zone proximate a rotor. Maintenance of a high tangential flow component in the bleed flow in the flow zone facilitates discharge of the flow through apertures in a rotor into a bore portion thereof, minimizing work input and temperature rise of the coolant. Further, the coolant is isolated from the hot casing wall and nonuniform structures disposed thereon, thereby reducing heat flux and temperature rise associated with aerodynamic drag caused by increased surface area, nonuniform interruptions in the stationary surface or any combination thereof. Features are incorporated in the tubular member to provide margin against buckling.

17 Claims, 2 Drawing Sheets

GAS TURBINE ENGINE COOLING SUPPLY CIRCUIT

The U.S. Government has rights in this invention pursuant to Contract No. N00019-89-C-0097.

TECHNICAL FIELD

The present invention relates generally to a turbine cooling circuit in a gas turbine engine and more specifically to an improved configuration supply for reducing the temperature of compressor bleed air delivered to a high pressure turbine interstage cavity.

BACKGROUND INFORMATION

In a conventional gas turbine engine comprising a compressor, combustor and turbine, both rotating turbine components such as blades, disks and retainers, and stationary turbine components such as vanes, shrouds and frames routinely require cooling due to heating thereof by hot combustion gases. Cooling of the turbine, especially the rotating components, is critical to the proper function and safe operation of the engine. Failure to adequately cool a turbine disk and its blading, for example, by providing cooling air deficient in supply pressure, volumetric flow rate or temperature margin, may be detrimental to the life and mechanical integrity of the turbine. Depending on the nature and extent of the cooling deficiency, the impact on engine operation may range from relatively benign blade tip distress, resulting in a reduction in engine power and useable blade life, to a rupture of a turbine disk, resulting in an unscheduled engine shutdown.

Balanced with the need to adequately cool the turbine is the desire for higher levels of engine operating efficiency which translate into lower fuel consumption and lower operating costs. Since turbine cooling air is typically drawn from one or more stages of the compressor and channelled by various means such as pipes, ducts and internal passageways to the desired components, such air is not available to be mixed with fuel, ignited in the combustor and undergo work extraction in the primary gas flowpath of the turbine. Total cooling flow bled from the compressor is therefore treated as a parasitic loss in the engine operating cycle, it being desirable to keep such losses to a minimum.

Prior art systems employ various schemes aimed at minimizing compressor bleed and concomitant cycle losses, for example, by attempting to control bleed source or cooling circuit parameters such as source pressure, pressure drop, flow rate or temperature. One type of system employs various active or passive means to modulate the volumetric flow rate of turbine cooling air at the bleed source, providing greater amounts when the need exists, for example as turbine temperature increases at high power throttle settings. Another type of system employs varying schemes of heat exchange, using engine lubrication system oil, for example, to cool the compressor bleed flow prior to delivery to the turbine. Such systems may reduce the amount of coolant flow required by delivering lower temperature air to the turbine. Alternatively, heat exchange systems may permit bleeding of the coolant from higher compression, higher temperature sources within the compressor which may better suit compressor operating efficiency or mechanical configuration. These and other known systems often add significant cost, weight and complexity to the engine. Further, such systems may consume precious volume within the engine or be mounted externally, thereby increasing the engine envelope in an attempt to make the components accessible for inevitable maintenance activity associated therewith. Finally, cooling system redundancy and/or fail-safe modes of operation are often implemented since the malfunction or failure of such systems is of concern, especially in light of the consequences resulting from inadequate turbine cooling.

SUMMARY OF THE INVENTION

A cooling supply circuit for a gas turbine engine comprises a compressor bleed source providing cooling air which is maintained in close proximity to a high speed rotor of the engine along a portion thereof by a uniformly contoured member and discharged into an internal rotor cavity in flow communication with turbine components to be cooled, thereby minimizing the work input to and temperature rise of the coolant. In a preferred embodiment, the cooling flow is bled from the tip of a centrifugal impeller and channelled along a backwall of the impeller into a large annular cavity bounded by the rotor and an inner wall of the combustor casing. To prevent loss of the beneficial high tangential flow component in the coolant velocity profile, a lightweight, axially extending tubular member having a smooth circumferential contour divides the cavity into a flow zone through which the cooling air flows and a non-flow or buffer zone through which substantially no coolant flows. By maintaining close proximity between substantially all the coolant flowing through the cavity and the high speed rotor, less work input is required to pump the coolant through the cavity and into a bore through apertures in the rotor. Hence, coolant temperature rise is nominal. Further, by segregating the flow in the cavity in this manner, temperature rise of the coolant is further minimized by eliminating aerodynamic drag resulting from interaction between the swirling coolant flow and the interrupted contour of the combustor casing inner wall. Radiant and convective heating of the coolant by the hot casing wall is also reduced.

BRIEF DESCRIPTION OF DRAWINGS

The novel features believed characteristic of the invention are set forth and differentiated in the appended claims. The invention, in accordance with preferred and exemplary embodiments, together with further advantages thereof, is more particularly described in the following detailed description taken in conjunction with the accompanying drawings in which:

MODE(S) FOR CARRYING OUT THE INVENTION

Figure 1:
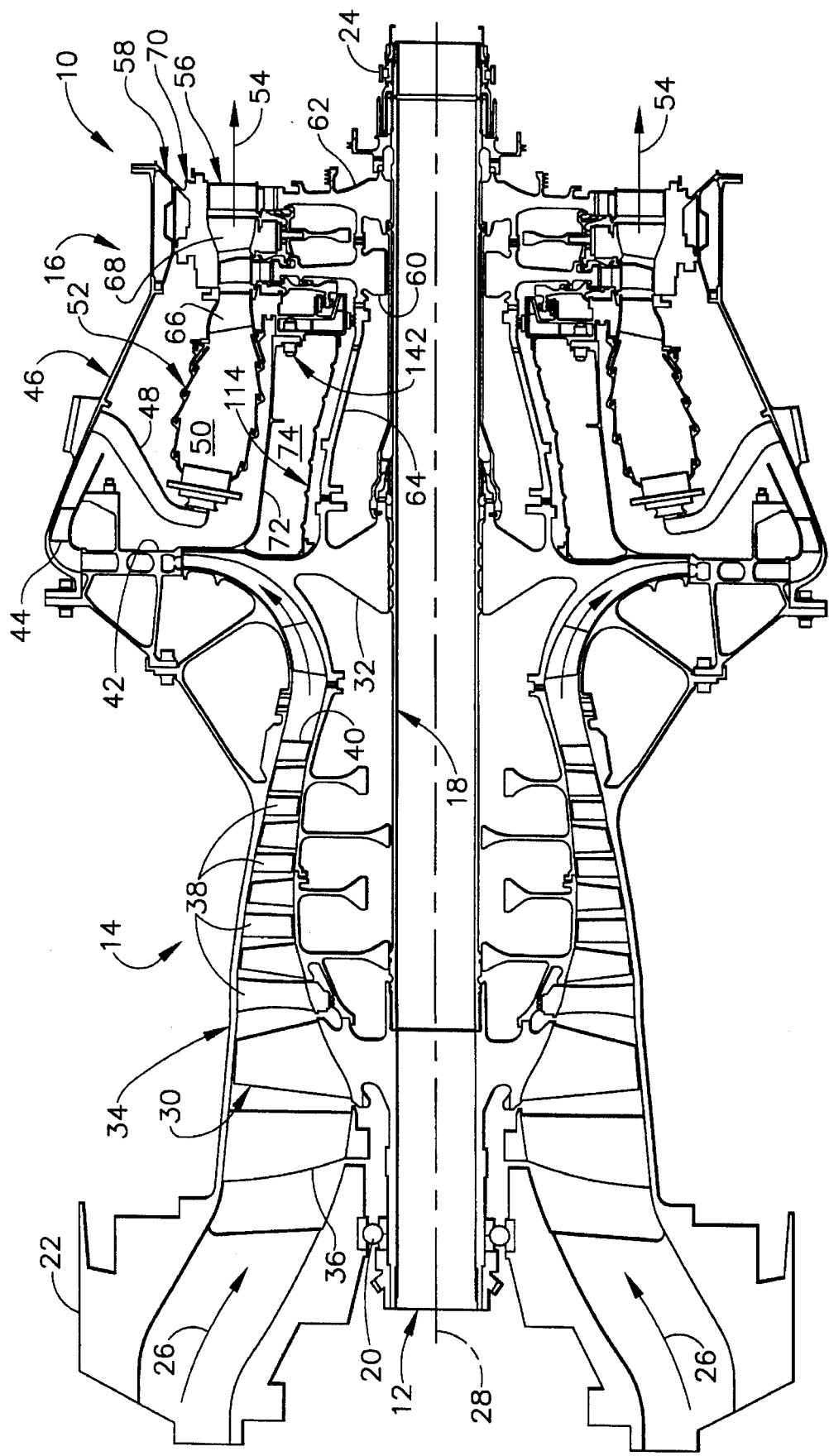
FIG. 1 is a schematic, sectional view of a high pressure gas generator portion of a gas turbine engine in accordance with a preferred embodiment of the present invention.

Shown in FIG. 1 is a schematic, sectional view of a high pressure gas generator apparatus 10 in accordance with a preferred embodiment of the present invention. A gas generator rotor 12 is comprised of a compressor 14, a turbine 16 disposed downstream thereof, and a tie rod 18 employed to axially clamp individual components of the rotor 12 in rotational driving engagement. The rotor 12 is supported for rotation about axis of rotation 28 within the apparatus 10 by forward bearing means 20 disposed in front frame 22 and rear bearing means, shown generally at 24, disposed downstream of turbine 16 in a turbine frame (not shown).

Inlet air 26 enters the compressor 14 through front frame 22 where it is conventionally compressed by the compressor 14. In the exemplary embodiment depicted herein, compressor 14 is comprised of a five stage axial compressor rotor 30, a single stage centrifugal impeller 32 and a compressor stator 34 comprising inlet guide vanes 36, interstage vanes 38, and outlet guide vanes 40. Air 26 exiting impeller 32 passes serially through diffuser 42 and deswirl cascade 44 into combustor casing 46 where it is conventionally mixed with fuel provided by a plurality of fuel nozzles 48 and ignited in an annular combustion zone 50 bounded by combustor 52. The resulting hot combustion exhaust gases 54 pass through the turbine 16, causing rotation of a turbine rotor 56 thereof, and continue downstream for further work extraction or exhaust as is conventionally known. In the exemplary embodiment depicted herein, turbine 16 is comprised of turbine rotor 56 and turbine stator 58. Turbine rotor 56 is further comprised of stage one disk 60, stage two disk 62 and forward shaft 64 which connects the turbine rotor 56 in rotational driving engagement to the compressor impeller 32. Turbine stator 58 is comprised of stage one nozzle 66, stage two nozzle 68 and shroud assembly 70. Disposed radially inwardly from inner wall 72 of combustor casing 46 is annular cavity 74 which extends radially from wall 72 to shaft 64.

Figure 2:
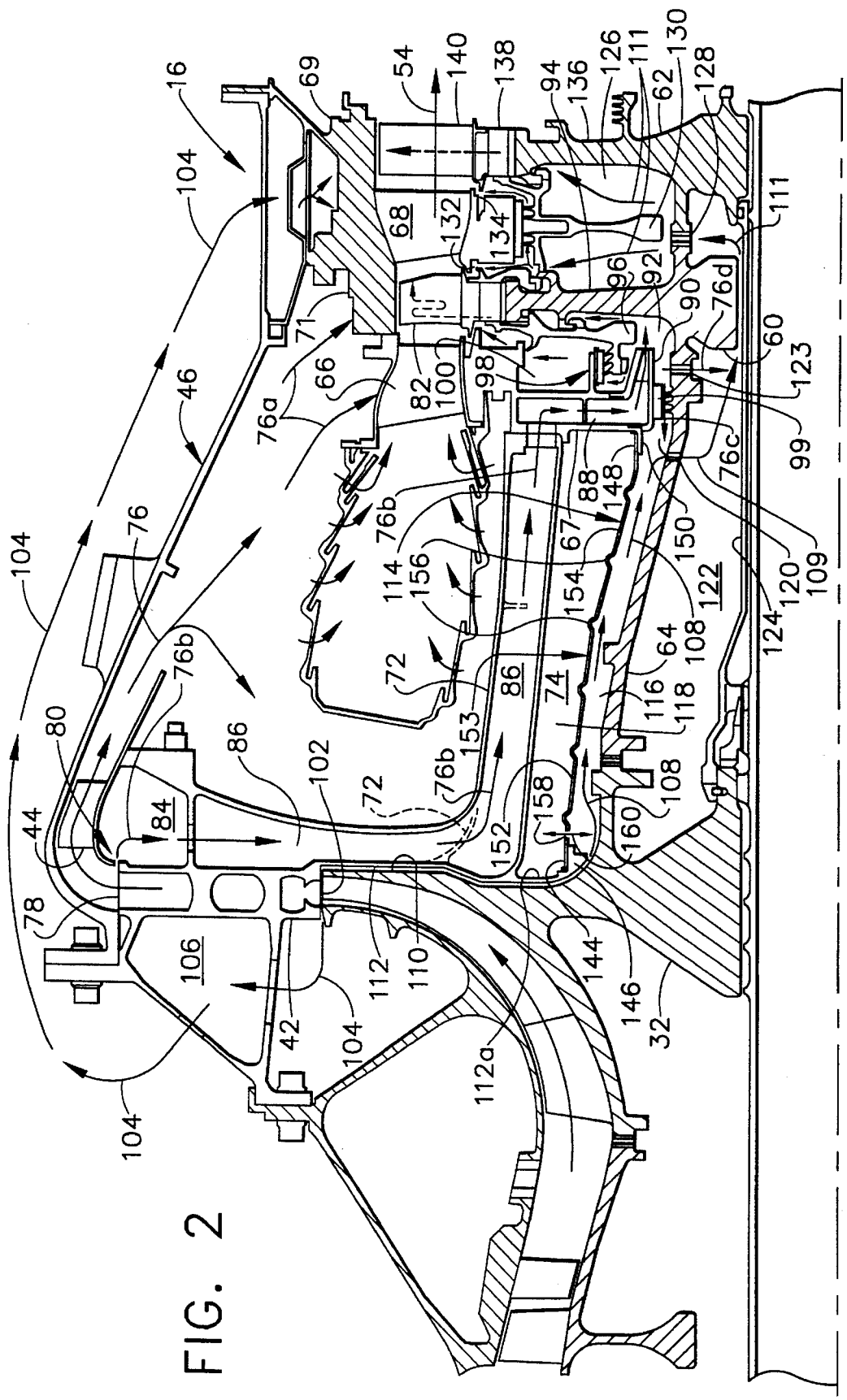
FIG. 2 is an enlarged, schematic partial sectional view of the turbine cooling supply circuits of the gas generator depicted in FIG. 1.

Referring now to FIG. 2, shown is an enlarged, schematic partial sectional view of cooling supply circuits for the turbine 16. The depiction in FIG. 2 is a different radial planar section than that of FIG. 1 and is presented to illustrate nonuniform features of the combustor casing 46, for example, which are relevant to the understanding and advantageous use of the invention in the instant application.

In addition to being used for combustion, compressor discharge pressure (CDP) air 76, which is disposed within combustor casing 46, is utilized to cool components of turbine 16 subjected to the hottest combustion gases 54, namely the stage one nozzle 66, a stage one shroud 71 and the stage one disk 60. Stage one nozzle cooling air 76a directly enters and cools the nozzle 66 and shroud 71 in a conventional manner as is well known in the art. In a preferred embodiment, stage one disk cooling air 76b is bled downstream of an outlet 78 of the diffuser 42 as the CDP air 76 enters the deswirl cascade 44 along an internal radius portion 80 thereof. Air 76b bled in this manner is substantially free of particulate matter which could clog fine cooling passages in the blading 82 of the stage one disk 60. Air 76b is collected in an annular manifold 84 and channeled radially inwardly through at least one duct 86. After passing through combustor casing inner wall 72, duct 86 turns axially, following wall 72, directing air 76b into annular manifold 88 which is in flow communication with tangential flow accelerator 90. The accelerator 90 discharges air 76b into stage one disk forward cavity 92 at a high tangential speed approaching wheelspeed of the stage one disk 60 at the radial position of the accelerator 90. Air 76b fills cavity 92 and flows radially outwardly between disk web 94 and blade retainer 96 to cool the disk 60 and blades 82 in a conventional manner. Additionally, leakage of air 76b through outer balance piston seal 98 purges cavity 100 preventing ingestion of hot combustion gases 54 therein.

An additional bleed source for turbine cooling air is a small, predetermined radial clearance located between the rotating impeller 32 and an inlet 102 of the static diffuser 42 to accommodate, inter alia, thermal and mechanical growth of the impeller 32. This clearance provides two sources of high pressure coolant for cooling turbine components, namely impeller tip forward bleed flow 104 and impeller tip aft bleed flow 108. Forward bleed flow 104 is collected in manifold 106 and may be channelled therefrom by external piping (not shown) to cool the stage two nozzle 68 and stage two shroud 69. Impeller tip aft bleed flow 108 is collected in cavity 74 after flowing radially inwardly along a backwall 110 of impeller 32, which is spaced a predetermined axial distance from an endwall 112 of combustor casing 46 to accommodate axial shifting of the rotor 12 during engine operation.

As stated above, cavity 74 extends radially inwardly from combustor casing inner wall 72 to rotor shaft 64. Further, cavity 74 extends in an axial direction from casing endwall extension 112a to stage one nozzle support 67. A tubular member 114 of substantially uniform circumferential contour is disposed in cavity 74 in such a manner as to essentially divide cavity 74 into an annular flow zone 116 proximate shaft 64 and an annular non-flow zone 118 proximate wall 72. Creation of zones 116, 118 in cavity 74 significantly reduces the temperature rise of bleed flow 108 passing therethrough as will be discussed in greater detail infra.

Bleed flow 108 in flow zone 116 is combined with CDP leakage flow 76c through inner balance piston seal 99 from cavity 92. This combined flow 109 is discharged from cavity 74 through a series of apertures 120 in shaft 64 into rotor bore 122. In an exemplary embodiment, apertures 120 comprise a quantity of eighteen cylindrical holes, each having a nominal diameter of 0.120 inches, which are disposed through shaft 64 in a single radial plane, each aperture 120 being nominally angled 15° from radial in a direction opposite that of rotation of shaft 64. The quantity, size and angle of apertures 120 are controlled to provide acceptable stresses in shaft 64 and permit substantially unrestricted flow of combined flow 109 therethrough. The velocity of flow 109 is controlled to prevent generation of acoustic resonances in cavity 122 which could cause detrimental excitation of a natural frequency of stage one disk 60, for example.

Once in bore 122, flow 109 flows in a downstream direction further combining with CDP leakage flow 76d from cavity 92 passing through radial face spline 123 disposed between shaft 64 and disk 60. Flows 109, 76d combine to form turbine cooling flow 111 which passes between the stage one disk 60 and air tube 124, ultimately entering interstage turbine cavity 126 through radial face spline 128 disposed between the stage one and two disks 60, 62. Flow 111 fills cavity 126, flowing radially outwardly between interstage seal 130 and stage two disk web 136 into a disk rim portion 138 to cool the disk 62 and associated blading 140 in a conventional manner. Further, cooling flow 111 flows radially outwardly between interstage seal 130 and stage one disk web 94 purging stage one disk aft cavity 132 directly and stage two disk forward cavity 134 with leakage flow through the interstage seal 130. Purging of cavities 132, 134 prevents ingestion of hot combustion gases 54 therein which, for example, could overheat stage two disk rim 138 resulting in release of blades 140 and significant engine damage.

In an exemplary embodiment, volumetric flow rate of turbine cooling flow 111 is comprised of approximately 40% bleed flow 108, 10% seal leakage flow 76c and 50% spline leakage flow 76d. Since bleed flow 108 comprises the majority of flow through zone 116 in cavity 74, the following comments are specifically directed thereto for simplicity; however, as those skilled in the art appreciate, the following discussion is equally relevant to seal leakage flow 76c.

Returning now to the discussion regarding the advantageous subdivision of cavity 74 into flow zone 116 and non-flow zone 118, in an exemplary embodiment, the temperature of bleed flow 108 may be on the order of 1000° F. upon entering cavity 74 when the gas turbine engine is operating in a high power setting. The temperature of combustor casing wall 72 is slightly higher due to the radiant heating thereof by the hot combustor 52. Importantly, as the bleed flow 108 initially enters the cavity 74, the flow 108 has a high tangential velocity component associated therewith, approximating rotational speed of the rotor 12 at the radius of shaft 64. Upon entering cavity 74 in the absence of member 114, bleed flow 108 immediately disperses into the cavity 74, in large part losing the tangential velocity component because of aerodynamic drag on the combustor casing inner wall 72. In order to discharge bleed flow 108 into rotor bore 122 through apertures 120, a substantial amount of work must be performed by the rotor shaft 64 on the bleed flow 108 to redevelop the requisite tangential velocity component necessary to permit passage of the flow 108 through apertures 120. The work input results in a significant temperature rise of the flow 108, for example on the order of approximately 100° F. in the aforementioned example and resultant higher temperature of flow 111 used to cool the turbine 16. By providing tubular member 114 which substantially restricts bleed flow 108 to an annular flow zone 116 at an outer radius of shaft 64, the high tangential component of velocity of the bleed flow 108 entering cavity 74 is maintained from entry through discharge therefrom. Since the flow 108 has not lost substantially any swirl velocity within cavity 74, no substantial work input into the flow 108 is required and therefore, no substantial temperature rise of the flow 108 is generated. Further, this configuration facilitates combining bleed flow 108 with seal leakage flow 76c which also has a high tangential velocity component associated therewith upon entering cavity 74. Additionally, maintaining the high tangential velocity components of flows 108, 76c substantially reduces the erosion of entrance profiles of apertures 120 caused by particulate matter entrained therein.

Beyond maintaining a high tangential velocity component in flow 108, tubular member 114 is further advantageously configured to provide a uniform, uninterrupted contour substantially matching the contour of shaft 64 to minimize aerodynamic drag losses and concomitant temperature rise in the bleed flow 108. As discussed supra, ducts 86 channeling stage one disk cooling air 76b pass through cavity 74. In an exemplary embodiment, three equiangularly spaced ducts 86 provide coolant 76b to manifold 88 along combustor casing wall 72. In the absence of member 114, these ducts create flow disturbances as bleed flow 108 spins in cavity 74. Further, as seen in FIG. 1, a plurality of threaded stud and nut combinations 142 used to attach manifold 88 to inner wall 72 extend into cavity 74 creating additional aerodynamic drag. Beyond dispersing the flow 108 and degrading the tangential flow component thereof, these nonuniform features increase heat transfer between the hot casing wall 72 and the cooler flow 108 thereby increasing temperature rise of flow 108 even further. In addition to the transfer of thermal energy by convection, aggravated by turbulent scrubbing due to the irregular contour of the cavity 74, some additional heating of the flow 108 occurs as a result of radiant energy transmission from the hot combustor wall 72. Introduction and placement of the uniformly contoured tubular member 114 to subdivide cavity 74 as disclosed herein eliminates drag losses associated with the ducts 86 and stud and nut combinations 142 while substantially reducing heat input as a result of convective and radiational thermal mechanisms.

As best seen in FIG. 2, an axial contour of member 114 generally matches that of shaft 64 such that a radial gap disposed therebetween remains substantially constant along a length thereof. Member 114 has a proximal cylindrical mounting section 144 located upon a flange 146 of endwall extension 112a and a distal cylindrical mounting section 148 captured by flange 150 of stage one nozzle support 67. A pin, tab or other similar feature (not shown) may be disposed on section 144 or flange 146 in a cooperating slot, for example, to prevent rotation of member 114 in the engine. Between mounting sections 144, 148, the contour of member 114 may be designed to provide stiffness and anti-buckling capability while substantially matching the contour of shaft 64. In a exemplary embodiment, tubular member 114 is comprised of thin sheet metal, for example Inconel 718 having a nominal thickness of 0.021 inches, readily deformable by conventional manufacturing techniques to produce a desired contour. In this example, member 114 comprises a forward frustoconical portion 152 extending from mounting section 144 to midpoint 153 and an aft frustoconical portion 154 extending from midpoint 153 to mounting section 148. Portion 152 has a diametral taper of about one quarter inch per inch of length and portion 154 a diametral taper of about one half inch per inch of length. Additionally, six stiffening ribs 156 of semicircular section having nominal internal radii of 0.07 inches are disposed circumferentially around member 114 at substantially equal axial spacing. Beyond providing frustoconical contouring 152, 154 and ribs 156, additional margin against pressure differential induced buckling may be provided by ensuring pressure normalization between flow zone 116 and non-flow zone 118. A small vent aperture 158 having a nominal diameter of 0.1 inches, for example, may be provided which accommodates normalization flow 160 between zones 116, 118 without substantially disrupting the tangential velocity component of bleed flow 108 in zone 116. In addition, some respective leakage flow between mounting sections 144, 148 and flanges 146, 150 is contemplated. Inclusion of frustoconical contours 152, 154, ribs 156 and pressure normalization means between zones 116, 118 allows for manufacture of member 114 from thinner material than would otherwise be required to provide sufficient buckling margin for all operating conditions, thereby reducing the cost and weight associated therewith.

By configuring and locating member 114 in this manner, the volume of zone 116 may be a relatively small percentage of the volume of cavity 74, for example 20% thereof, affording advantageous maintenance of the tangential velocity component of bleed 108 discussed supra. In a particular application, a lower or higher volume ratio may be desirable depending, inter alia, on the volume of cavity 74 and volumetric flow rate of the bleed flow 108. Additionally, division of cavity 74 and formation of zone 116 by placement of member 114 creates a substantially circumferentially uniform plenum bounding bleed flow 108, unlike cavity 74 having numerous circumferential interruptions such as cooling ducts 86 and stud and nut combinations 142. Further, due to the radially inwardly tapering of shaft 64, cross-sectional area of the plenum or flow zone 116 decreases in the aft or downstream direction, thereby accelerating flow 108 slightly. The frustoconical contour 152, 154 or mounting sections 144, 148 may be suitably modified to enhance this effect or may alternatively be modified to provide a diverging plenum to decelerate flow 108 if desired.

While there have been described herein what are considered to be preferred embodiments of the present invention, other modifications of the invention will be apparent to those skilled in the art from the teaching herein. For example, depending on the requirements of a particular application, member 114 could be made of any suitable material and may be comprised of more than one piece. Further, member 114 may cooperate with axially extending portions of structure associated with combustor casing 46, stage one nozzle support 67 or other proximate engine structure to form flow cavity 116. Yet further, the function and structure of member 114 could be incorporated in combustor casing 46 and cast as an integral portion thereof, although access to stud and nut combinations 142 must be provided or alternate means to attach manifold 88 implemented. Still further, a plurality of concentric nested members 114 could be configured to provide a series of annular flow zones or plenums for a single cooling circuit or a plurality thereof. Alternatively, nested members 114 may provide for a series of individual flow zones 116 disposed individually between a series of non-flow zones 118. Instead of impeller tip bleed 108, other bleed flows from other sources in an axial compressor could be utilized in conjunction with the teachings of this invention and the structure being cooled need not be a turbine 16 but could be any component, for example, a bearing sump.

It is therefore desired to be secured in the appended claims all such modifications as fall within the true spirit and scope of the invention. Accordingly, what is desired to be secured by Letters Patent of the United States is the invention as defined and differentiated in the following claims.

We claim:

1. In a gas turbine engine having an axis of rotation and a compressor driven by a turbine disposed downstream thereof, an apparatus for cooling said turbine comprising:
   a first cooling air supply circuit comprising:
   a primary cooling air source providing primary cooling air;
   means for channelling said primary cooling air from said primary cooling air source to an annular manifold; and
   means for discharging said primary cooling air from said manifold into a first turbine cavity to cool turbine components in flow communication therewith; and
   a second cooling air supply circuit comprising:
   a secondary cooling air source providing secondary cooling air, said secondary cooling air source comprising a secondary bleed apparatus in flow communication with compressor discharge airflow upstream of an inlet of a diffuser, said diffuser being in flow communication with said compressor;
   means for channelling said secondary cooling air from said secondary cooling air source to an axially extending annular plenum of substantially uniform uninterrupted circumferential contour; and
   means for discharging said secondary cooling air from said plenum into a second turbine cavity to cool turbine components in flow communication therewith.

2. The invention according to claim 1 wherein:
said primary cooling air source comprises a first bleed apparatus in flow communication with compressor discharge airflow downstream of an outlet of said diffuser.

3. The invention according to claim 2 wherein:
said primary cooling air channeling means comprises at least one duct disposed between, and in flow communication with, each of said first bleed apparatus and said manifold, said at least one duct having said primary cooling air flowing therethrough; and
said secondary cooling air channeling means comprises an annular gap proximate a backwall of said impeller stage, said gap extending between, and in flow communication with, each of said second bleed apparatus and said plenum, said gap having said secondary cooling air flowing therethrough.

4. The invention according to claim 1 wherein:
said plenum comprises a rotating plenum wall and a non-rotating plenum wall.

5. The invention according to claim 4 wherein:
said non-rotating plenum wall comprises means to prevent buckling.

6. The invention according to claim 5 wherein:
said buckling prevention means comprises at least a partially frustoconical contour of said non-rotating plenum wall.

7. The invention according to claim 5 wherein:
said buckling prevention means comprises at least one circumferentially extending stiffening rib in said non-rotating plenum wall.

8. The invention according to claim 5 wherein:
said buckling prevention means comprises at least one vent aperture in said non-rotating plenum wall.

9. The invention according to claim 4 wherein:
said secondary cooling air discharge means comprises at least one aperture in said rotating plenum wall.

10. The invention according to claim 4 wherein:
said rotating plenum wall comprises a portion of a rotor disposed between said compressor and said turbine, said rotor being disposed radially inwardly with respect to said axis of rotation from said non-rotating plenum wall.

11. In a gas turbine engine having an axis of rotation and a compressor driven by a turbine disposed downstream thereof and a combustor casing disposed therebetween, a turbine cooling supply circuit apparatus comprising:
    means for bleeding cooling air from said compressor;
    means for channeling said cooling air from said bleed means to an annular cavity disposed with respect to said axis of rotation radially inwardly from said combustor casing;
    means disposed in said cavity for dividing said cavity into an annular flow zone and an annular non-flow zone; and
    means for discharging said cooling air from said flow zone into a rotor bore zone to cool turbine components in flow communication therewith.

12. The invention according to claim 11 wherein:
said cavity dividing means comprises a tubular member of substantially uniform uninterrupted circumferential contour which axially extends the length of said cavity.

13. The invention according to claim 12 wherein:
said tubular member comprises means to prevent buckling.

14. The invention according to claim 13 wherein:
said buckling prevention means comprises at least a partially frustoconical contour of said tubular member.

15. The invention according to claim 13 wherein:
said buckling prevention means comprises at least one circumferentially extending stiffening rib in said tubular member.

16. The invention according to claim 13 wherein:
said buckling prevention means comprises at least one vent aperture in said tubular member providing flow communication between said flow zone and said non-flow zone.

17. The invention according to claim 11 wherein:
said cooling air discharge means comprises at least one aperture disposed in a portion of a rotor disposed between said compressor and said turbine, said rotor bounding, in part, said annular flow zone.

* * * * *